(12) United States Patent
Furuya et al.

(10) Patent No.: US 8,137,093 B2
(45) Date of Patent: Mar. 20, 2012

(54) TIEBAR REVERSE EXTRACTION CLAMP

(75) Inventors: Hiroaki Furuya, Yamaguchi (JP); Junji Manabe, Yamaguchi (JP); Fumiaki Matsubara, Yamaguchi (JP); Shinji Sannakanishi, Saitama (JP)

(73) Assignees: Ube Machinery Corporation, Ltd. (JP); Ahresty Corporation (JP)

( * ) Notice: Subject to any disclaimer, the term of this patent is extended or adjusted under 35 U.S.C. 154(b) by 592 days.

(21) Appl. No.: 12/305,012

(22) PCT Filed: Jun. 7, 2007

(86) PCT No.: PCT/JP2007/061955
§ 371 (c)(1),
(2), (4) Date: Dec. 16, 2008

(87) PCT Pub. No.: WO2007/148591
PCT Pub. Date: Dec. 27, 2007

(65) Prior Publication Data
US 2009/0202670 A1    Aug. 13, 2009

(30) Foreign Application Priority Data
Jun. 19, 2006  (JP) .................................. 2006-169174

(51) Int. Cl.
*B29C 45/64* (2006.01)
(52) U.S. Cl. ..................... 425/190; 164/342; 425/451.9; 425/595
(58) Field of Classification Search .................. 425/186, 425/190, 192 R, 451.9, 595; 164/342
See application file for complete search history.

(56) References Cited

U.S. PATENT DOCUMENTS

| | | | | |
|---|---|---|---|---|
| 3,465,387 A | * | 9/1969 | Allard et al. | 425/590 |
| 3,882,588 A | * | 5/1975 | McFalls et al. | 425/190 |
| 3,951,579 A | * | 4/1976 | Myers et al. | 425/190 |
| 4,025,264 A | * | 5/1977 | Hehl | 425/190 |
| 5,417,913 A | * | 5/1995 | Arend | 425/595 |
| 6,120,722 A | * | 9/2000 | Schad | 425/190 |
| 7,311,517 B2 | * | 12/2007 | Manabe et al. | 425/595 |
| 7,371,061 B2 | * | 5/2008 | Tsuji et al. | 425/190 |
| 7,429,169 B2 | * | 9/2008 | Tsuji et al. | 425/190 |
| 7,824,167 B2 | * | 11/2010 | Tsuji et al. | 425/190 |
| 2003/0217829 A1 | * | 11/2003 | Baron et al. | 164/341 |
| 2005/0281908 A1 | | 12/2005 | Tsuji et al. | |

FOREIGN PATENT DOCUMENTS

| | | |
|---|---|---|
| JP | 8-72113 A | 3/1996 |
| JP | 8-117959 A | 5/1996 |
| JP | 9-57808 A | 3/1997 |
| JP | 2000-52353 A | 2/2000 |
| JP | 2005-144802 A | 6/2005 |
| JP | 2006-880 A | 1/2006 |

\* cited by examiner

*Primary Examiner* — James Mackey
(74) *Attorney, Agent, or Firm* — DLA Piper LLP (US)

(57) ABSTRACT

A clamp includes (a) a first engager that engages with engagement parts formed at ends of the tiebars at the moving platen side after moving the moving platen in the fixed platen direction to close a die or mold, in the tiebar insertion holes of the moving platen, (b) a second engager that engages with engagement parts formed at ends of the tiebars at the fixed platen sides detachably at ends of clamping pistons using a detachable engager, (c) a pushing device that cooperates with the tiebars and pushes the moving platen after die or mold closing against the fixed platen in the tiebar insertion holes of the fixed platen, and (d) a tiebar inserting and extracting device coupled with ends of the tiebars at the fixed platen sides at a side of the fixed platen opposite to the die or mold mounting surface.

14 Claims, 3 Drawing Sheets

PRIOR ART

US 8,137,093 B2

TIEBAR REVERSE EXTRACTION CLAMP

TECHNICAL FIELD

The present invention relates to a clamp of a die casting machine, injection molding machine, etc.

BACKGROUND ART

In general, a clamp of a die casting machine or injection molding machine is structured arranging a fixed platen supporting a fixed die or mold and a moving platen supporting a moving die or mold on a base plate, fixing ends of tiebars (usually four) passing through the moving platen at the fixed platen, and making the moving platen advance and retract along the tiebars to and from the fixed platen to open/close the die or mold and produce cast articles or molded articles.

In casting (or die casting) or injection molding using the above clamp, the work of changing the mold or die becomes necessary due to a change in the cast article or molded article, wear of the mold or die, etc., but at the time of the changing work, the presence of the tiebars sometimes obstructs the mold or die changing work, so to secure work safely and ease, usually a structure is employed pulling out the tiebars from the fixed platen to the moving platen side (see, for example, Japanese Patent Publication (A) No. 8-72113, Japanese Patent Publication (A) No. 9-57803, Japanese Patent Publication (A) No. 2000-52353, Japanese Patent Publication (A) No. 2005-144802, and Japanese Patent Publication (A) No. 2006-880).

FIG. 1 shows one aspect of a conventional clamp (see Japanese Patent Publication (A) No. 2005-144802). On a base plate 1, a fixed platen 2 supporting a fixed mold 3 is fixed. Further, a moving platen 4 supporting a moving mold 5 is arranged to be able to advance and retract to and from the fixed platen 2 through slide shoes 6.

Further, front ends of tiebars 10 passing through insertion holes 7 and 8 provided at the four corners of the fixed platen 2 and moving platen 4 are detachably fastened to the fixed platen 2 by first fasteners 11 (boxes 14 in which openable split nuts 15 engaging with threads 13 are arranged).

Further, the middle parts of the tiebars 10 are detachably fastened to the moving platen 4 by second fasteners 12 (boxes 17 in which openable split nuts 18 engaging with multiple straight grooves 16 are arranged).

The moving platen 4 has oil hydraulic cylinders 20 mounted on it corresponding to the positions of arrangement of the tiebars 10. Further, the front ends of the rods 20a of the upper oil hydraulic cylinders 20A mounted on the moving platen 4 are coupled through coupling members 21 to the other ends of the upper tiebars 10, while the front ends of the rods 20b of the lower oil hydraulic cylinders 20B mounted at the bottom of the moving platen 4 (partially housed in the slide shoes 6) are coupled through the coupling members 21 to the other ends of the lower tiebars 10.

In the state using the first fasteners 11 to maintain the fastened states of the tiebars 10 and releasing the fastened states of the tiebars 10 by the second fasteners 12, if operating the oil hydraulic cylinders 20 (upper oil hydraulic cylinders 20A and lower oil hydraulic cylinders 20B) to extend and retract, since the tiebars 10 are fastened, the moving platen 4 can advance and retract to and from the fixed platen 2 to open/close the mold.

When changing the fixed mold 3 and moving mold 5, in the open state, the fastened states of the tiebars 10 by the first fasteners 11 are released, then the upper oil hydraulic cylinders 20A are made to extend to the maximum extent. The lower oil hydraulic cylinders 20B are used to fix the position of the moving platen 4, so the above operation of the upper oil hydraulic cylinders 20A causes the upper tiebars 10 to retract and open the top of the part between the fixed platen 2 and moving platen 4 to form a work space enabling mold changing work to be performed without obstruction.

In this way, a conventional clamp employs a structure pulling out the tiebars 10 to the rear of the moving platen at the time of changing molds, so when installing a clamp in a factory, it is necessary to provide sufficient tiebar retraction space behind the moving platen.

However, the tiebar retraction space, as explained above, is a space prepared for just enabling retraction of the tiebars at the time of changing molds. While the clamp is working, it is a completely unused space. Furthermore, when the tiebars have retracted, it is necessary to avoid breakage or damage to the tiebars due to collision or contact with other equipment, apparatuses, etc., so it is necessary to avoid arranging other equipment and apparatuses in the tiebar retraction space.

If the clamp is made large in size, the tiebar retraction space also must be made large along with this, but securing a larger tiebar retraction space used only when changing the molds in the limited installation space is itself not preferable from the viewpoint of the efficient utilization of the installation space.

Further, if the tiebar retraction space is large in the limited installation space, the space for arranging various equipment required for control of the clamp inevitably becomes narrower. This creates a situation making it necessary to densely arrange various control equipment in a narrow space, which degrades the work environment, and makes maintenance and inspection work of the control equipment difficult.

The illustrated patent documents disclose technology for pulling out tiebars in clamps, but all of these employ structures predicated on structures pulling out the tiebars from the fixed platen sides to the rear of the moving platen sides at the time of changing molds, so when installing the above clamps in factories, it is necessary to provide sufficient tiebar retraction space behind the moving platens.

That is, in the structures of conventional clamps, no means or improvements are being made from the viewpoint of the effective utilization of the installation space.

DISCLOSURE OF THE INVENTION

The present invention, in view of the above state, has as its object the provision of a clamp not requiring a large tiebar retraction space or large sized pull even if the clamp becomes larger when pulling out the tiebars at the time of changing dies or molds and enabling the pullout operation to be performed simply and easily.

The inventors engaged in intensive studies on the means for solving the above problems and as a result came up with the idea of pulling out the tiebars, reverse to the tiebar pullout in conventional clamps, "from the moving platen to the rear of the fixed platen (side opposite to die or mold mounting surface) and thereby discovered means for realizing this pullout (reverse extraction) simply and easily.

The present invention was made based on the above discovery and has as it gist the following:

(1) A clamp providing a moving platen and a fixed platen with tiebar insertion holes and inserting tiebars through them and arranging the moving platen to be able to advance and retract along the tiebars to and from the fixed platen, said clamp (a) providing first engaging means, for engaging with engagement parts formed at ends of the tiebars at the moving platen side after moving the moving platen in the fixed platen direction to close a die or mold, in the tiebar insertion holes of the moving platen, (b) providing second engaging means for engaging with engagement parts formed at ends of the tiebars at the fixed platen sides detachably at ends of clamping pistons using detachable engaging means, (c) providing pushing means for cooperating with the tiebars and pushing the moving platen after closing the die or mold against the fixed platen in the tiebar insertion holes of the fixed platen, and (d) providing tiebar inserting means coupled with ends of the tiebars at the fixed platen sides at a side of the fixed platen opposite to the die or mold mounting surface.

(2) A tiebar reverse extraction clamp as set forth in (1) wherein the engagement parts formed at the ends of said tiebars at the moving platen sides are parts formed with straight grooves, and said first engaging means are split nut means.

(3) A tiebar reverse extraction clamp as set forth in (1) or (2) wherein said pushing means are fluid cylinder mechanisms.

(4) A tiebar reverse extraction clamp as set forth in any one of (1) to (3) wherein said engagement parts formed at ends of the tiebars at the fixed platen sides are parts formed with spiral grooves, and said second engaging means are fixed nut means.

(5) A tiebar reverse extraction clamp as set forth in any one of (1) to (4) wherein said detachable engaging means are comprised of holding plates and holding plate moving means.

(6) A tiebar reverse extraction clamp as set forth in any one of (1) to (5) wherein said holding plate moving means are provided with driving means comprising horseshoe shaped liners, liner guides, and fluid cylinders.

(7) A tiebar reverse extraction clamp as set forth in any one of (1) to (6) wherein said tiebar inserting and extracting means are provided with drives comprised of chains and sprockets, electric motors, and control equipment of the insertion and extraction speed.

In the present invention, since it is possible to pull out the tiebars, reverse to conventional clamps, in the direction from the moving platen to the fixed platen (side opposite to die or mold mounting surface) simply and easily, it is possible to improve the degree of utilization of the installation space and perform die or mold changing work quickly and safely.

BEST MODE FOR CARRYING OUT THE INVENTION

The present invention will be explained based on the drawings.

Figure 1:
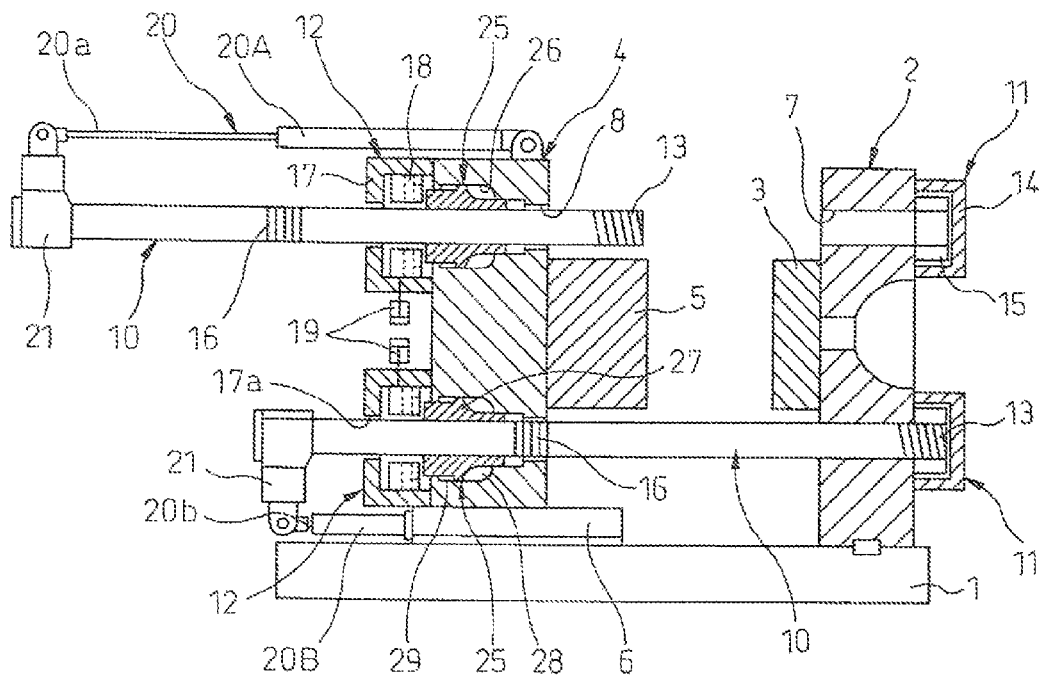
FIG. 1 is a view showing an aspect of a conventional clamp.
Figure 2:
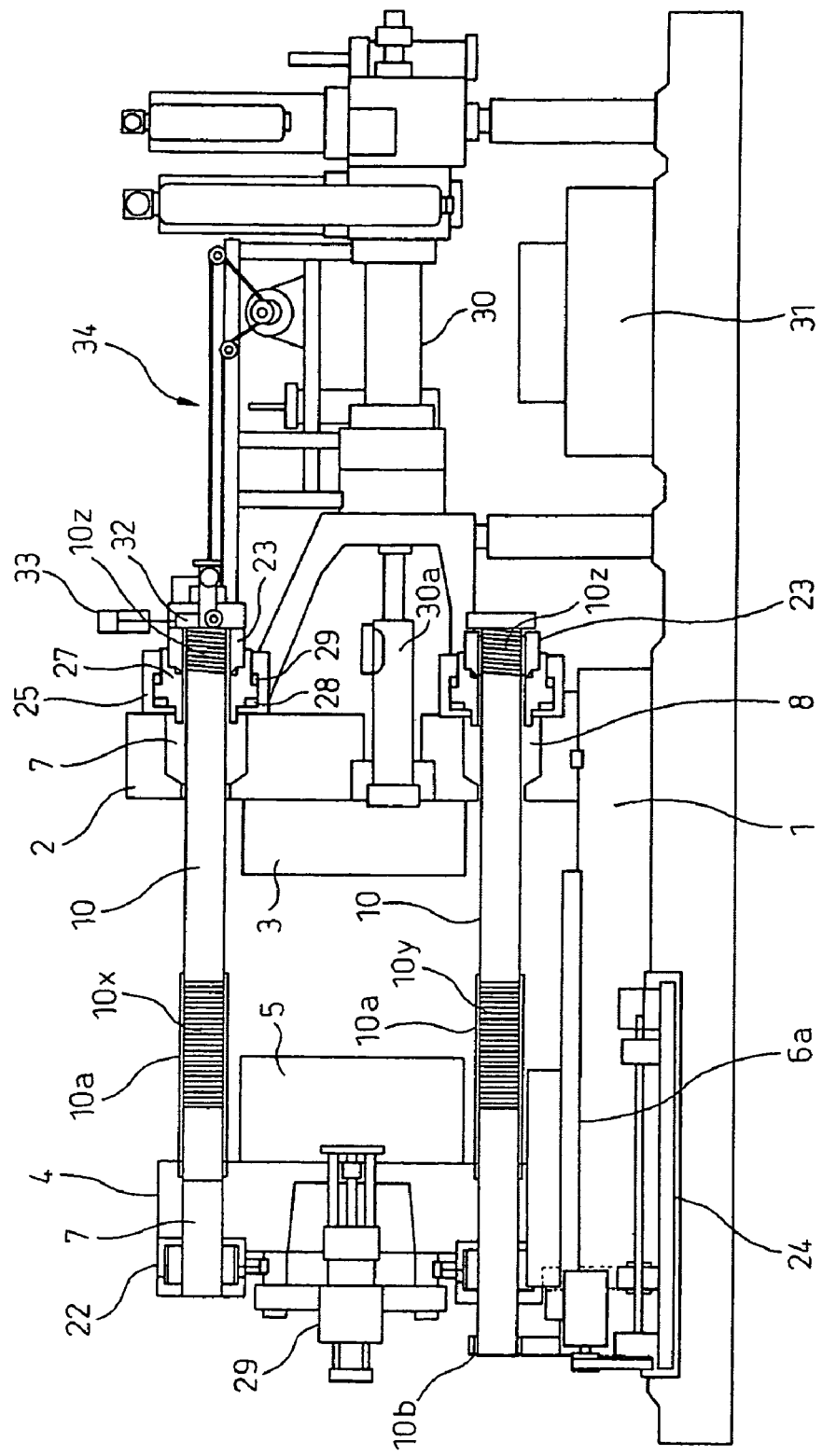
FIG. 2 is a view showing an aspect of a clamp of the present invention.

FIG. 2 shows one aspect of the clamp of the present invention (hereinafter sometimes simply referred to as "the present invention"). Note that component members the same as in the clamp shown in FIG. 1 are shown by the same reference numerals as the reference numerals shown in FIG. 1.

At the end of a base plate 1, a fixed platen 2 supporting a fixed die 3 is fixed. Further, on the base plate 1, a moving platen 4 supporting a moving die 5 is arranged to be able to advance and retract to and from the fixed platen 2 through a moving platen support member 6a.

At the rear surface of the moving platen 4, an ejector 29 for taking out the cast article or molded article from the moving die 5 is attached. Further, at the bottom end of the moving platen 4, an opening/closing apparatus 24 is attached for making the moving platen 4 advance and retract on the moving platen support member 6a to and from the fixed platen 2 to open/close the die.

Note that FIG. 2 shows a clamp which is in the state of opening the die.

The fixed platen 2 is provided with an injection sleeve 30a connected to the fixed die 3. In the state with the die closed, an injector 30 injects molten metal through the injection sleeve 30a into the die.

The fixed platen 2 and the moving platen 4 are formed with tiebar insertion holes 7 and 8 at their four corners. The insertion holes 7 and 8 have tiebars 10 inserted through them. Note that the tiebar insertion holes 7 and 8 of the moving platen 4 have tiebar covers 10a connected to them. Further, outside the lower tiebar insertion holes 8, tiebar supports 10b for supporting the tiebars 10 are arranged.

At the upper tiebars 10, near the ends at the moving platen sides, while at the lower tiebars 10, at the middle parts, engagement parts 10x and 10y are formed engaging with the split nuts of the split nut devices 22 coupled with the tiebar insertion holes 7 and 8 (first engaging means). At these engagement parts 10x and 10y, straight grooves are formed for engaging with the split nuts.

The ends of the tiebars 10 at the fixed platen sides are provided with engagement parts 10z at which spiral grooves are formed for engaging with nuts of the fixed nut devices 23 (second engaging means).

The tiebar insertion holes 7 and 8 of the fixed platen 2 have clamping cylinders 25 having built-in pistons 27 and provided with oil chambers 28 and 29 (pushing means) arranged in them. The fixed nut devices 23 (second engaging means) are detachably connected to ends of the pistons 27 of the top clamping cylinders 25 (pushing means) by detachable engaging means comprised of holding plate movers 33 (holding plate moving means) and holding plates 32 moving (in the figure, moving up/down) by being driven by the holding plate movers 33.

After the die or mold is closed, a power unit 31 is used to control a hydraulic pressure mechanism (not shown) to feed oil to the oil chambers 28. While doing so, oil is discharged from the oil chambers 29 to drive the pistons 27.

Due to the driving of the pistons 27, the fixed nut devices 23 (second engaging means) tightly connected with the ends of the pistons 27 due to the holding reaction force of the holding plates 32 and engaged with the engagement parts 10z of the tiebars 10 (second engaging means) receive ejection force in the direction of side opposite to the die or mold mounting surface (in the figure, right direction), so the moving platen 4 after die or mold closing is further pushed to the fixed platen 2 whereby a clamping operation is realized after the closing operation.

The holding plate movers 33 (holding plate moving means), at the time of die or mold clamping, hold the holding plates 32 at positions firmly holding the connections between the fixed nut devices 23 and ends of the pistons 27 and, further, at the time of tiebar pullout, move the holding plates 32 (in the figure, lift them upward) to disconnect the fixed nut devices 23 and the ends of the pistons 27.

The holding plate movers 33, to realize the above functions, can be comprised of mechanical means like, for example, horseshoe shaped liners, liner guides, fluid cylinders, etc., but they may also be comprised of other mechanical means. Further, they may also be comprised of electrical means. The means for realizing the above functions of the holding plate movers 33 are not limited to specific mechanical means or electrical means.

Further, in the clamp shown in FIG. 2, the side where the injector 30 is arranged (side opposite to die or mold mounting surface) is provided with tiebar inserting and extracting devices 34 (tiebar inserting and extracting means) engaging with the ends of the tiebars 10 at the fixed platen side.

That is, the clamp shown in FIG. 2 employs a structure pulling out the tiebars 10 to the side where the injector 30 is provided (side opposite to die or mold mounting surface) reverse to the pullout direction of tiebars in conventional clamps. This point is a characterizing feature of the present invention.

FIG. 2 shows a tiebar inserting and extracting devices provided with a drive comprised of a chain and sprocket, but the tiebar inserting and extracting devices may also be provided with other drives, for example, drives comprised of timing belts and pulleys or means for directly driving the tiebars by electric motors or fluid (pressure) cylinders.

Further, providing the tiebar inserting and extracting devices with electric motors or control equipment controlling the insertion speeds is preferable from the viewpoints of automating and speeding up the tiebar pullout operation.

Further, in the clamp shown in FIG. 2, the tiebar inserting and extracting devices were arranged at the side opposite to the die or mold mounting surface along the closing direction (that is, the tiebar pullout direction), but the present invention, as explained above, is characterized in that the tiebars are pulled out, reverse to the pullout direction in a conventional clamp, to the side opposite to the die or mold mounting surface. It is sufficient that this pullout can be realized, so the tiebar inserting and extracting devices do not necessarily have to be arranged along the closing direction (that is, the tiebar pullout direction).

The position of arrangement of the tiebar inserting and extracting devices may be determined considering overall the layout of the injector and peripheral equipment, the insertion and extraction mechanisms of the tiebar inserting and extracting means, etc.

Here, the tiebar pullout operation will be explained based on FIGS. 3A to 3D.

Figure 3:
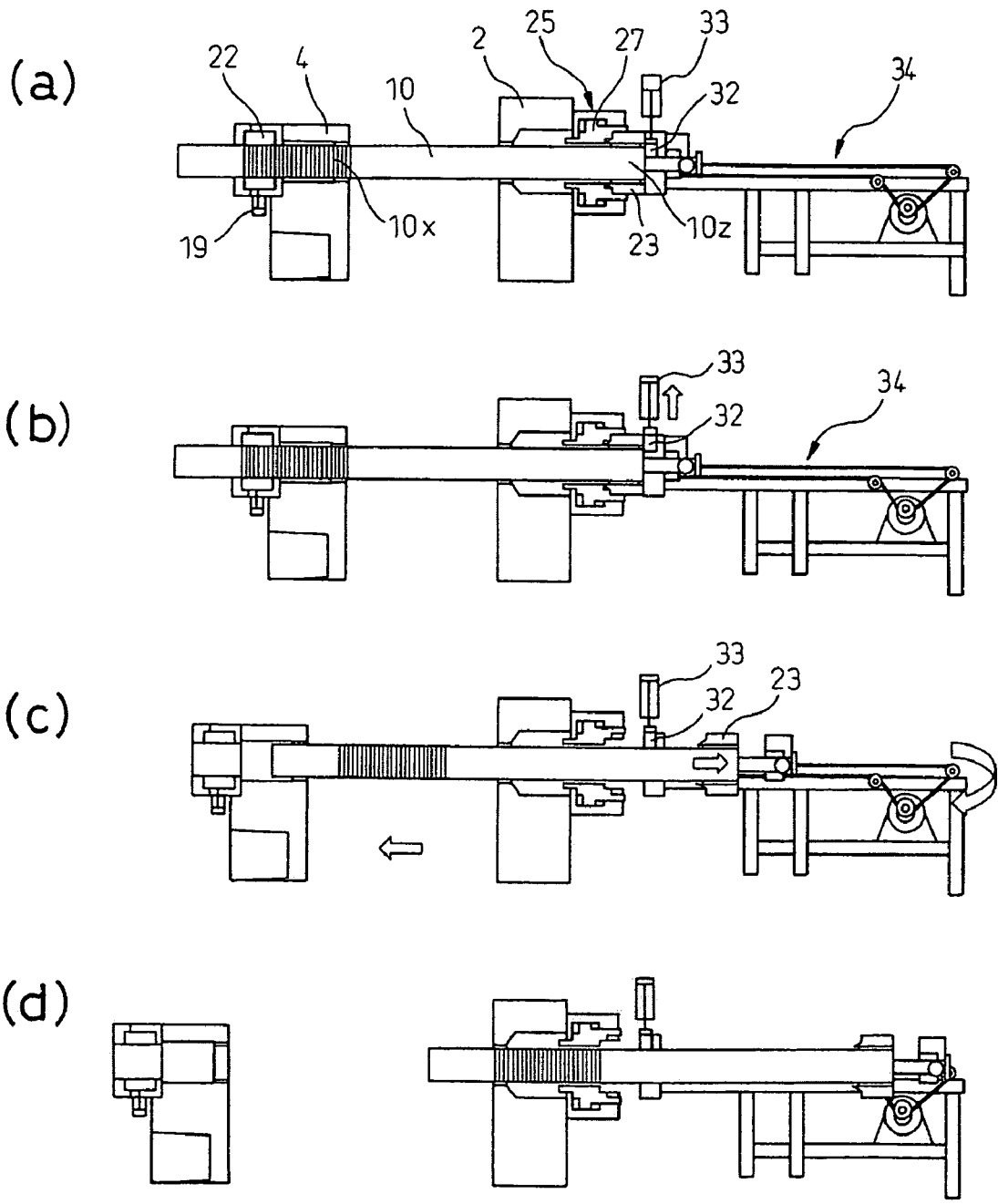
FIG. 3 is a view showing an aspect of a tiebar pullout operation in a clamp of the present invention. (a) shows a state with the die or mold open. (b) shows the state where the end of a piston and the fixed nut device are disconnected. (c) shows a state where the pullout of a tiebar has started. (d) shows the state where the pullout of a tiebar has finished.

FIG. 3A shows the state of driving the split nut movers 19 to disengage the split nut devices 22 from the engagement parts 10x of tiebars 10, separating the moving platen 4 from the fixed platen 2, and opening the die or mold (not shown). To change the die or mold, the operation of pulling out the tiebars from this state is started.

First, as shown in FIG. 3B, the holding plate movers 33 (holding plate moving means) are driven to pull the holding plates 32 upward (in the figure, see arrow) and disconnect the ends of the pistons 27 of the clamping cylinders 25 (pushing means) and the fixed nut devices 23 (second engaging means) engaged with the engagement parts 10z of the tiebars 10.

Next, as shown in FIG. 3C, the tiebar inserting and extracting devices 34 (tiebar inserting and extracting means) engaged with the ends of the tiebars are driven (in the figure, see right arrow) to start the pullout of the tiebars 10 and the moving platen 4 is made to separate from the fixed platen 2 in the movable range (in the figure, see left arrow).

The state where the pullout of the tiebars 10 and the separation of the moving platen 4 from the fixed platen 2 are completed is shown in FIG. 3D. As shown in FIG. 3D, in the present invention, the tiebars are pulled out to the side opposite to the die or mold mounting surface, so when installing the clamp in a factory, unlike the case of installing a conventional clamp, it is not necessary to provide a tiebar retraction space in the space outside of the moving platen.

If applying the present invention, it is possible to effectively utilizing the space of the clamp behind the moving platen for some sort of application. Only naturally, it is possible to place the die to be installed or changed die or mold or equipment for changing the die or mold in the above space.

Further, as shown in FIG. 3A to 3D, in the present invention, at the time of tiebar pullout, there is no need to complicatedly drive the moving platen 4 and the tiebar pullout operation also becomes simple, so the tiebars can be quickly pulled out.

In this way, in the present invention, by the quick tiebar pullout, it is possible to immediately widely open up the top space between the fixed platen and the moving platen and perform the die or mold changing work without obstruction of course and possible to place the die to be installed or changed die or mold or equipment for changing the die or mold near the moving platen, so the die or mold changing work can be performed quickly and safely.

Above, aspects of the tiebar pullout operation in the present invention were explained, but after the end of the die or mold changing work, an operation opposite to the tiebar pullout operation is performed to insert the tiebars in the tiebar insertion holes of the moving platen and fixed platen.

In the clamp of the present invention, the tiebar pullout/insertion operation can be performed quickly in the space occupied by the clamp including peripheral equipment, so the die or mold changing work can be made faster and safer while securing the safety of the tiebar pullout/insertion operation.

INDUSTRIAL APPLICABILITY

As explained above, in the present invention, the tiebars can be simply and easily pulled out opposite to the conventional clamp in the direction from the moving platen to the fixed platen (side opposite to die or mold mounting surface), the degree of utilization of the installation space is raised, and the die or mold changing work can be quickly and safely performed. Therefore, the present invention has a good chance of being employed for the clamps of newly installed die casting machines, injection molding machines, etc.

The invention claimed is:

1. A clamp providing a moving platen and a fixed platen each with tiebar insertion holes and tiebars extending therethrough, the moving platen being able to advance and retract along the tiebars to and from the fixed platen, the tiebars having first engagement parts and second engagement parts, comprising:
   (a) a first engaging means that engage with the first engagement parts of the tiebars after the moving platen is moved along the tiebars towards the fixed platen to close a die or mold arranged in the clamp,
   (b) a second engaging means that engage with the second engagement parts, the second engagement parts being formed at ends of the tiebars positioned proximally to the fixed platen,
   (c) a pushing means that cooperates with the tiebars and pushes the moving platen toward the fixed platen after the die or mold is closed, the pushing means being arranged in the tiebar insertion holes of the fixed platen and detachably connected to the second engaging means, and (d) a tiebar inserting and extracting means for inserting and extracting the tiebars into or from the tiebar insertion holes, the tiebar inserting and extracting means being coupled with ends of the tiebars adjacent to the fixed platen and positioned distally to a side of the fixed platen that engages the die or mold.

2. The clamp as set forth in claim 1, wherein the first engagement part are parts formed with straight grooves, and said first engaging means are split nut devices.

3. The clamp as set forth in claim 1, wherein said pushing means are fluid cylinder mechanisms.

4. The clamp as set forth in claim 1, wherein said second engagement parts are parts formed with spiral grooves, and said second engaging means are fixed nut devices.

5. The clamp as set forth in claim 1, wherein said pushing means is detachably connected to said second engaging means by a holding plate and holding plate mover.

6. The clamp as set forth in claim 5, wherein said holding plate mover comprises at least one of a horseshoe shaped liner, liner guide, and fluid cylinder.

7. The clamp as set forth in claim 1, wherein said tiebar inserting and extracting means comprises at least one of a chain and sprocket drive, electric motor, and control equipment.

8. A clamp providing a moving platen and a fixed platen each with tiebar insertion holes and tiebars extending therethrough, the moving platen being able to advance and retract along the tiebars to and from the fixed platen the tiebars having first engagement parts and second engagement parts, comprising:
   (a) a first engaging device that engages with the first engagement parts of the tiebars after the moving platen is moved along the tiebars towards the fixed platen to close a die or mold arranged in the clamp,
   (b) a second engaging device that engages with the second engagement parts, the second engagement parts being formed at ends of the tiebars positioned proximally to the fixed platen,
   (c) a pushing device that cooperates with the tiebars and pushes the moving platen toward the fixed platen after the die or mold is closed, the pushing device being arranged in the tiebar insertion holes of the fixed platen and detachably connected to the second engaging device, and
   (d) a tiebar inserting and extracting device, the tiebar inserting and extracting device being coupled with ends of the tiebars adjacent to the fixed platen and positioned distally to a side of the fixed platen that engages the die or mold.

9. The clamp as set forth in claim 8, wherein the first engagement parts are parts formed with straight grooves, and said first engaging device is split nut devices.

10. The clamp as set forth in claim 8, wherein said pushing device is a fluid cylinder mechanism.

11. The clamp as set forth in claim 8, wherein said second engagement parts are parts formed with spiral grooves, and said second engaging device is fixed nut devices.

12. The clamp as set forth in claim 8, wherein said pushing device is detachably connected to said second engaging device by a holding plate and holding plate mover.

13. The clamp as set forth in claim 12, wherein said holding plate mover comprises at least one of a horseshoe shaped liner, liner guide, and fluid cylinder.

14. The clamp as set forth in claim 8, wherein said tiebar inserting and extracting device comprises at least one of a chain and sprocket drive, electric motor, and control equipment.

* * * * *